(12) United States Patent
Mani et al.

(10) Patent No.: US 10,277,421 B2
(45) Date of Patent: Apr. 30, 2019

(54) ROUTE LOOKUP RESOLUTION

(75) Inventors: Mahalingam Mani, Cupertino, CA (US); David Ahrens, San Jose, CA (US)

(73) Assignee: Extreme Networks, Inc., San Jose, CA (US)

(*) Notice: Subject to any disclaimer, the term of this patent is extended or adjusted under 35 U.S.C. 154(b) by 1614 days.

(21) Appl. No.: 13/285,392

(22) Filed: Oct. 31, 2011

(65) Prior Publication Data

US 2013/0111042 A1 May 2, 2013

(51) Int. Cl.
*G06F 15/16* (2006.01)
*H04L 12/64* (2006.01)

(52) U.S. Cl.
CPC .................. *H04L 12/6418* (2013.01)

(58) Field of Classification Search
CPC .......... H04L 63/0815; H04L 29/12594; H04L 61/2007; H04L 29/12141; H04L 41/0233; H04L 67/16; G06F 21/41; G06F 17/30566; G06F 17/30241; Y10S 707/99931; H04N 21/4126; H04N 21/4622; H04N 21/21
USPC ................................. 709/227, 239
See application file for complete search history.

(56) References Cited

U.S. PATENT DOCUMENTS

| | | | |
|---|---|---|---|
| 6,718,376 B1 * | 4/2004 | Chu et al. | 709/223 |
| 6,778,524 B1 * | 8/2004 | Augart | 370/351 |
| 7,035,846 B2 * | 4/2006 | Gupta et al. | |
| 7,370,102 B1 * | 5/2008 | Chu et al. | 709/223 |
| 7,376,827 B1 * | 5/2008 | Jiao | 713/153 |
| 7,454,462 B2 * | 11/2008 | Belfiore et al. | 709/203 |
| 7,496,751 B2 * | 2/2009 | de Jong et al. | 713/155 |
| 7,502,761 B2 * | 3/2009 | Siegal et al. | 705/67 |
| 7,580,999 B1 * | 8/2009 | Mann et al. | 709/224 |
| 7,793,284 B2 * | 9/2010 | Mason et al. | 717/174 |
| 7,802,264 B2 * | 9/2010 | Robertson et al. | 709/215 |
| 7,877,381 B2 * | 1/2011 | Ewen et al. | 707/719 |
| 7,933,272 B2 * | 4/2011 | Morris | 370/392 |
| 7,933,921 B2 * | 4/2011 | Ellard | 707/770 |
| 8,019,771 B2 * | 9/2011 | Iwao | 707/759 |
| 8,046,489 B2 * | 10/2011 | Blom et al. | 709/238 |
| 8,069,435 B1 * | 11/2011 | Lai | G06Q 10/10 717/106 |
| 8,401,028 B2 * | 3/2013 | Mihaly et al. | 370/400 |
| 8,526,426 B2 * | 9/2013 | Weaver et al. | 370/352 |
| 8,583,642 B2 * | 11/2013 | Gupta et al. | 707/736 |
| 2002/0069278 A1 * | 6/2002 | Forslow | 709/225 |
| 2003/0088614 A1 * | 5/2003 | Bellaton et al. | 709/203 |
| 2003/0091267 A1 * | 5/2003 | Alvarez et al. | 385/16 |
| 2003/0163733 A1 * | 8/2003 | Barriga-Caceres et al. | 713/201 |
| 2004/0249971 A1 * | 12/2004 | Klinker | 709/239 |
| 2005/0190901 A1 * | 9/2005 | Oborn et al. | 379/114.02 |
| 2006/0021010 A1 * | 1/2006 | Atkins et al. | 726/5 |

(Continued)

*Primary Examiner* — John B Walsh
(74) *Attorney, Agent, or Firm* — Sterne, Kessler, Goldstein & Fox, PLLC

(57) ABSTRACT

Methods and systems for routing connections between federated enterprises are provided. More particularly, user location information is stored as part of a first directory accessible to a federation broker. Location information obtained in association with a requested connection is used by the federation broker to access a second directory containing the locations of points of presence within the enterprise that includes the target communication device.

20 Claims, 3 Drawing Sheets

(56) References Cited

U.S. PATENT DOCUMENTS

| | | | |
|---|---|---|---|
| 2006/0085829 A1* | 4/2006 | Dhodapkar | H04N 7/17318 725/105 |
| 2006/0248598 A1* | 11/2006 | Johnson et al. | 726/27 |
| 2007/0107048 A1* | 5/2007 | Halls et al. | 726/4 |
| 2007/0168496 A1* | 7/2007 | Bansod et al. | 709/224 |
| 2007/0208711 A1* | 9/2007 | Rhoads et al. | 707/3 |
| 2007/0294427 A1* | 12/2007 | Retkin et al. | 709/245 |
| 2008/0010288 A1* | 1/2008 | Hinton | G06F 17/30545 |
| 2008/0082658 A1* | 4/2008 | Hsu et al. | 709/224 |
| 2008/0086564 A1* | 4/2008 | Putman et al. | 709/227 |
| 2009/0254392 A1* | 10/2009 | Zander | 705/7 |
| 2010/0005071 A1* | 1/2010 | Kakivaya et al. | 707/3 |
| 2010/0071053 A1* | 3/2010 | Ansari et al. | 726/12 |
| 2010/0142447 A1* | 6/2010 | Schlicht et al. | 370/328 |
| 2010/0202450 A1* | 8/2010 | Ansari et al. | 370/389 |
| 2010/0287171 A1* | 11/2010 | Schneider | 707/759 |
| 2010/0287286 A1* | 11/2010 | Bustamente | H04L 63/0407 709/228 |
| 2011/0202651 A1* | 8/2011 | Hilt | H04L 67/1072 709/224 |
| 2011/0209195 A1* | 8/2011 | Kennedy | 726/1 |
| 2011/0213859 A1* | 9/2011 | Greene et al. | 709/218 |
| 2011/0225293 A1* | 9/2011 | Rathod | 709/224 |
| 2011/0295983 A1* | 12/2011 | Medved | H04L 45/00 709/220 |
| 2012/0011190 A1* | 1/2012 | Driesen et al. | 709/202 |
| 2012/0191651 A1* | 7/2012 | Irizarry, Jr. | 707/634 |
| 2012/0207151 A1* | 8/2012 | Alt et al. | 370/354 |
| 2012/0290555 A1* | 11/2012 | Wu et al. | 707/707 |
| 2012/0317207 A1* | 12/2012 | Eydelman et al. | 709/206 |
| 2013/0046664 A1* | 2/2013 | Kazerani | G06F 9/541 705/34 |
| 2013/0124921 A1* | 5/2013 | Canini et al. | 714/33 |
| 2013/0198242 A1* | 8/2013 | Levy | 707/803 |
| 2013/0219176 A1* | 8/2013 | Akella et al. | 713/165 |
| 2013/0219456 A1* | 8/2013 | Sharma et al. | 726/1 |

* cited by examiner

ROUTE LOOKUP RESOLUTION

FIELD

The invention relates to the routing of communications. More particularly, endpoint location information is used to select an entry point for communication links between federated domains.

BACKGROUND

Packet data networks, including Internet protocol (IP) communication networks typically utilize domain name system or service (DNS) lookups in order to route calls within an enterprise or domain. Where a destination or endpoint is associated with a different enterprise or domain from that of the originating endpoint, the completion of the communication link requires that the destination domain be resolved. In a typical federated system, this requires a secure DNS lookup at a federation broker, typically located within the cloud. Provided the security requirements of the federation broker are met, the required routing information is returned to the originating enterprise or domain, and in particular to the communications server (e.g., a call server) handling the requested communication. The communication server can then apply the received information to complete the communication link to the endpoint in the other enterprise or domain.

Often, a destination enterprise or domain is associated with multiple points of presence (POPs). In routing a call to a communication device, it is generally advantageous to use a point of presence that is close to that endpoint. However, in a typical system, the information returned by the DNS does not attempt to resolve to a point of presence nearest the destination communication device. As a result, the routing of calls or other communication links using conventional techniques can be inefficient.

SUMMARY

According to embodiments of the present disclosure, systems and methods for routing to a point of presence of a destination enterprise or domain selected on the basis of the proximity of that point of presence to a destination communication device are provided. More particularly, a two-level directory is provided. Specifically, a first directory includes information related to a location of the destination or endpoint communication device. This first or user directory can be indexed according to a communication endpoint identifier. The location information obtained from the first directory is then used to access or index a second or peer directory. The second directory contains point of presence information for the enterprise or domain with which the first communication device is associated. Accordingly, a point of presence that is near the destination communication device can be identified by applying the location information obtained from the first directory to the second directory.

The first and second directories can be accessed by a federation broker in response to a request for a domain name system (DNS) lookup received at the federation broker. In addition, the federation broker can serve as a host for the first and second directories. The first or user directory can obtain location information for a plurality of users associated with one or more enterprises or domains. The second or peer directory can include point of presence information for multiple enterprises or domains. In addition, the determination of a nearest point of presence to an identified communication endpoint can be determined based on various factors. These factors can include a geographic or physical location, a network or logical location, an associated cost, an expected latency, or the like. More particularly, the location information associated with the destination communication device can be accessed by applying a hint in the form of a user name or other user identifier associated with the target communication endpoint to identify an appropriate point of presence for use in establishing a communication link or connection to the communication endpoint, where multiple points of presence are available.

DETAILED DESCRIPTION

Figure 1:
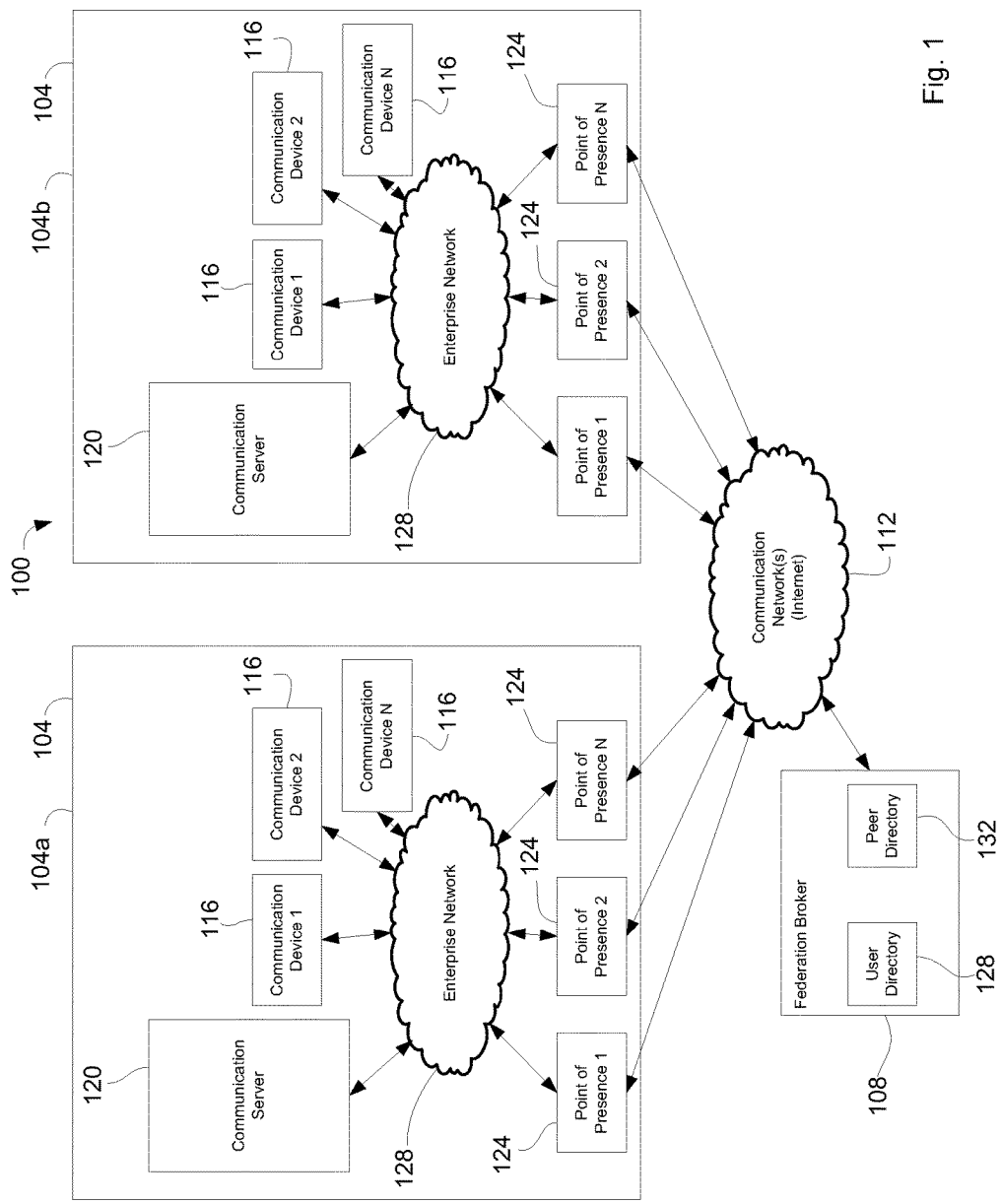
FIG. 1 depicts an exemplary system in accordance with embodiments of the invention.

FIG. 1 illustrates an exemplary federated communication system 100. The federated system 100 generally includes two or more federated domains or enterprises 104 related to one another as part of a brokered federation. Accordingly, although first 104*a* and second 104*b* enterprises are shown in the figure, a system 100 can include more than two federated enterprises 104. In addition, the system 100 includes a federation broker 108. The enterprises 104 are interconnected to one another and to the federation broker 108 by one or more communication networks 112.

Each domain or enterprise system 104 can include a number of devices or nodes. For example, each enterprise 104 can include a plurality of communication devices or endpoints 116, and one or more communication servers 120. An enterprise 104 can additionally include one or more points of presence 124. The various components or nodes 116, 120 and 124 within an enterprise 104 can be interconnected to one another by an enterprise network 128.

A communication endpoint 116 can include, for example and without limitation, a telephone, personal computer, laptop computer, tablet computer, smart phone, or any other device or node capable of initiating or terminating a communication session or link. Moreover, a connection comprising a communication session or link as used herein may comprise a voice telephony communication, a video telephony communication, a teletype communication, an instant messaging session, a chat session, or any other real time or near real time connection between communication devices or endpoints 116.

A communication server 120 generally operates to provide and/or support communication sessions or other connections between components of one or more enterprises 104, including communication devices 116. As an example and without limitation, a communication server 120 can comprise a call server or communication manager. For instance, a communication server 120 can comprise an Internet protocol private branch exchange (IPPBX), such as the Avaya Aura™ session manager. Moreover, a communication server 120 can support various protocols, including the session initiation protocol (SIP), and/or unified communications (UC).

A point of presence 124 can, for example and without limitation, include a gateway, security gateway, or other access point to an enterprise 104. Each point of presence 124 associated with an enterprise 104 can have one or more addresses, such as but not limited to Internet protocol (IP) addresses. Moreover, different points of presence 124 included in an enterprise 104 can be associated with different physical locations. As an example, an enterprise 104 with operations in different cities can provide a point of presence 124 in each of those cities. With respect to an enterprise 104 having distributed components, including communication devices 116 in different geographic locations, it is generally advantageous to route connections from communication devices 116 associated with a first domain or enterprise 104a to a point of presence 128 that is near the destination or target communication device 116 associated with a second domain or enterprise. However, an enterprise 104 will typically support connections to an included communication endpoint 116 through any of a plurality of points of presence 124 included in that enterprise 104.

An enterprise network 128 can include one or more networks capable of supporting connections between components of an enterprise 104. Examples of an enterprise network 128 therefore include one or more Internet protocol networks, such as a collection of wired and/or wireless Ethernet networks.

The federation broker 108 generally operates to provide information required to complete connections between federated enterprises 104. The information provided by the federation broker 108 can include information related to the entry point or point of presence 124 for an enterprise 104 and other information, such as Internet protocol addresses for a domain or enterprise 104 entry point, destination communication device 116 or other nodes, naming authority pointer (NAPTR) information, server record (SRV) pointers, and the like. Accordingly, the federation broker 108 can operate as a repository for some or all of the information required in order to complete a communication session or connection between a communication endpoint 116 associated with a first enterprise 104a and a communication endpoint 116 associated with a second enterprise 104b. In accordance with embodiments of the present disclosure, the federation broker 108 includes a first or user directory 128 and a second or peer directory 132. In general, the user directory 128 includes information related to users of communication devices 116 included in a federated enterprise 104. More particularly, the user directory 128 includes information regarding the location of users associated with communication devices 116, indexed by user name or other user identifier. The location can be an assumed or likely location, such as the user's office location. Accordingly, an assumed or likely location of a user can be obtained from the user directory 128 by providing the federation broker with a hint in the form of the user name or other user identifier. As used herein, a location can include a geographic or physical location. As additional examples, a location can include a location with respect to components of a communication network 112 and/or 128. This location information regarding users of communication devices 116 can be used to access the peer directory 132 in order to determine an efficient routing of a requested connection. More particularly, the peer directory 132 contains a listing of enterprise 104 points of presence 124, indexed by location. Therefore, once location information for a user associated with a communication device 116 included in a federated enterprise 104 has been obtained from the user directory 128, that location information can be applied to the peer directory 132 to identify an appropriate point of presence 124 to use in completing the requested connection. The information included in the peer directory 132 can include the IP address for a point of presence 124 included in the enterprise 104 of which the destination communication device 116 is a part, that is near the destination communication device 116. The federation broker 108 can be located in the cloud, such that it can be accessed by one or more communication servers 120 within a federation of enterprises 104.

The communication network or networks 112 may comprise any type and any number of communication mediums and devices that are capable of supporting communication sessions between enterprises 104 and/or the federation broker 108 within the system 100, including communication sessions or links, or other connections, between communication endpoints 116 associated with different enterprises 104. Examples of communication sessions that may be supported by the communication network or networks 112 include voice calls, video calls, chats, emails, teletype (TTY) calls, multimedia sessions, or the like.

More particularly, the communication network or networks 112 can include one or more local area networks (LANs) one or more wide area networks (WANs), one or more session initiation protocol (SIP) networks, and any other type of packet switched or circuit switched network known in the art. In addition, the communication network or networks 112 need not be limited to any one network type, and instead may be comprised of a number of different networks and/or network types. The communication network or networks 112 may further include an IP multimedia subsystem (IMS), an architectural substandard well known in the art, or any other type of network that provides access to one or more of the Internet, standard plain old telephone system (POTS), an integrated services digital network (ISDN), the public switched telephone network (PSTN), and any type of cellular communication or other wireless network.

As can be appreciated by one of skill in the art after consideration of the present disclosure, a federated system 100 can support a plurality of communication sessions or links, also referred to herein as connections, in various communication link formats between communication endpoints 116 within an enterprise 104, and between federated enterprises 104, that are established over a communication network or networks 112. Moreover, in order to complete communication links between endpoints in different enterprises 104, certain connection information is required. As examples, and without limitation, such connection information can include an endpoint 116 telephone number, points of presence or the entry point, or other information.

Figure 2:
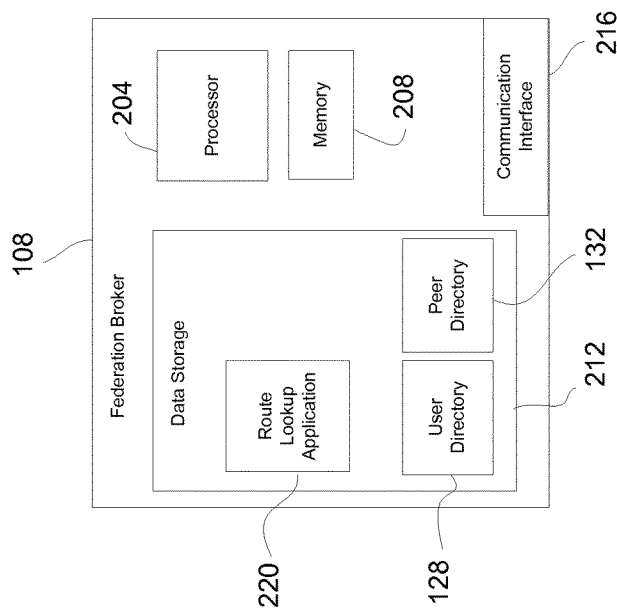
FIG. 2 illustrates components of a federation broker in accordance with embodiments of the present disclosure.

FIG. 2 illustrates components of a federation broker 108 in accordance with embodiments of the present disclosure in greater detail. The federation broker 108 can comprise a server device having a processor 204 and memory 208. The processor 204 can comprise the processor 204 can comprise a general purpose programmable processor or controller for executing application programming or instructions. As a further example, the processor 204 may comprise a specially configured application specific integrated circuit (ASIC) or other integrated circuit, digital signal processor, hardwired electronic or logic circuit such as a discrete element circuit, programmable logic device or gate array, such as a PLD, PLA, FPGA, PAL, special purpose computer, or the like. The processor 204 generally functions to run programming code or instructions implementing various functions of the federation broker 108. The memory 208 can be used in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the disclosed invention, data storage 212 can contain programming code or instructions implementing various of the applications or functions executed or performed by the federation broker 108.

In accordance with embodiments of the present disclosure, the memory 208 and/or data storage 212 can serve as a repository for the user directory 128 and/or the peer directory 132. Alternatively or in addition, one or more of the directories 128 and 132, or portions of those directories 128 and 132, can reside in data storage provided as part of an interconnected data storage system. The memory 208 and/or data storage 212 can additionally include various applications. For example, a route lookup application 220 can be provided. In general, the route lookup application 220 can operate to perform operations as described herein. Such operations include receiving information identifying a user associated with a destination communication device 116 from a communication server 120 included in an enterprise 104 that is part of a federation of enterprises 104, accessing the user directory 128 to obtain location information using the user identification information, applying the obtained location information to the peer directory 132 to identify an appropriate point of presence 124 to use to convert the enterprise 104 that includes the target communication endpoint 116, and returning information related to the identified point of presence to the communication server 120 that initiated the request.

The federation broker 108 additionally can include one or more communication interfaces 216. In general, a communication interface 216 serves to operably interconnect the federation broker 108 to the communication network 112.

Figure 3:
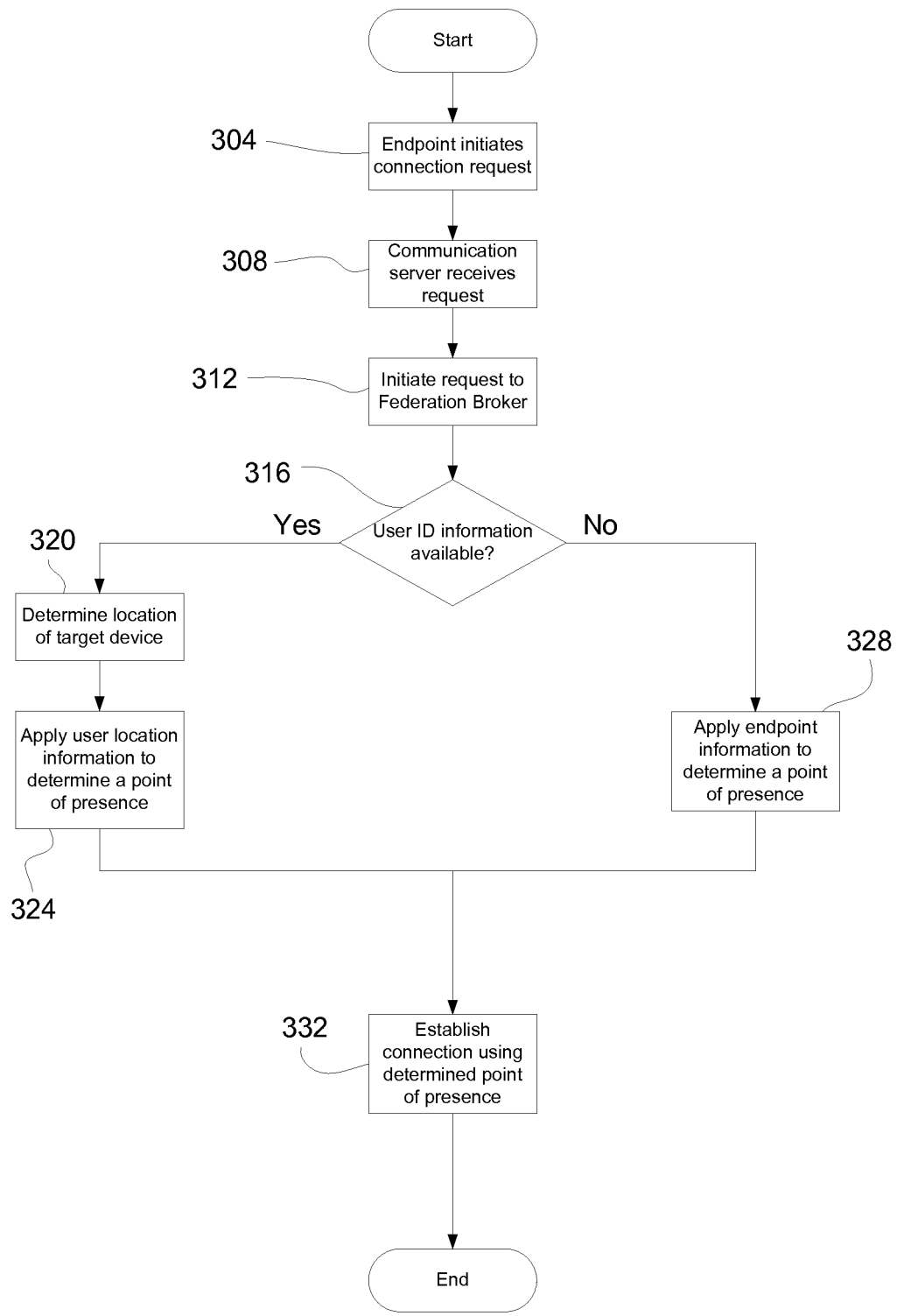
FIG. 3 is a flowchart illustrating aspects of the operation of a system in accordance with embodiments of the present disclosure.

With reference now to FIG. 3, aspects of the operation of a system 100 in accordance with embodiments of the disclosed invention are illustrated. Initially, at step 304, a communication endpoint 116 included within a first enterprise 104a initiates a request for a communication session with or connection to a communication endpoint 116 associated with a second enterprise 104b. In accordance with embodiments of the present disclosure, the communication endpoint 116 is associated with an associated user.

As an example, and without limitation, the request can be for a voice telephony connection or link to an individual. Alternatively or in addition, a user can comprise an organizational unit within an enterprise. The request is received at the communication server 120 included in the enterprise 104a associated with the initiating communication device 116 (step 308). The communication server 120 then initiates a request to the federation broker 108 (step 312). The request includes a user name or other information identifying a user associated with the target communication device. The federation broker 108 contains addressing and other information required to complete a connection between communication devices 116 included in the first enterprise 104a and communication devices 116 included in a second, federated enterprise 104b. Moreover, making a request to the federation broker 108 can include transmitting that request via the communication network 112.

At step 316, the federation broker 108, through operation of the route lookup application 220, determines whether location information for a user associated with the destination communication device 116 is available. This can include determining whether the information provided by the communication server 120 to the federation broker 108, in addition to a communication address (e.g., a telephone number) for a destination communication device 116, includes a user name or other user identification information. The user identifier information can operate as a hint that allows the federation broker 108 to provide user location information. In particular, and as can be appreciated by one of skill in the art, an Internet protocol address for a communication device 116 can be assigned dynamically. Therefore, an IP address cannot be used as a reliable indicator of a location of a communication endpoint 116. However, a user name or other information identifying a user associated with the destination communication device 116 can serve as an indicator of the location of the target communication device 116. If user location information has been provided by the communication server 120, that information is applied by the route lookup application 220 on the federation broker 108 to determine a physical location of the target communication device 116 (step 320). More particularly, the user identification information is used to access the user directory 128, and to obtain location information associated with the user. At step 324, the user location information is applied to identify a point of presence for use in completing the requested connection. More particularly, the location information obtained from the first or user directory 128 is used to identify a point of presence in the second or peer directory 132 that is in proximity to the identified user location. As used herein, proximity can comprise physical or geographic proximity. In accordance with alternate embodiments, proximity can include network or logical location, an associated cost, an expected latency, or the like. This determination can be made through operation of the route lookup application 220. More particularly, a route lookup application 220 can apply rules for identifying a best or nearest point of presence 124 from a list of points of presence with respect to the identified location of the target communication device 116.

If user identification or location information for a user associated with a target communication device 116 is not available, the communication endpoint 116 information is applied to determine a point of presence without regard to location (step 328). More particularly, the address information for the destination or target communication device 116 provided by the communication server 120 is used to identify a point of presence 124 for the enterprise 104 associated with the target communication device 116, without attempting to identify a point of presence 124 that is nearest the target communication device 116. That is, at step 328, a point of presence 124 is identified conventionally.

After identifying a point of presence 124 at step 324 or step 328, a connection is established using that determined point of presence 124 (step 332). Where the point of presence 124 was identified using user location information obtained in steps 320 and 324, the point of presence 124 will typically be nearest the target communication device 116. However, this is not necessarily the case. For instance, if the target communication device 116 has changed location, either through the repositioning of a fixed communication endpoint 116, or because the communication endpoint 116 is mobile, a different point of presence 124 may in fact be nearer. However, where the user identification information and associated user directory 128 and peer directory 132 is accurate, operation of the system 100 disclosed herein can provide a more optimal routing of a connection. For example, by selecting a nearest point of presence 124, the routing within the enterprise 104 that includes the target communication device 116 can be improved as compared to systems that do not consider the proximity of the target communication device 116 to the point of presence 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for routing communications, comprising:
   receiving, at a federation broker, a request for a connection to an endpoint, wherein the endpoint is a node in a system;
   accessing, at the federation broker, a first directory and a second directory, wherein the first directory comprises information related to a location of the endpoint, and the second directory comprises information related to a plurality of points of presence providing entry points to the system; and
   identifying, by the federation broker, a point of presence from the plurality of points of presence that is determined to be near the location of the endpoint.

2. The method of claim 1, further comprising:
   accessing, by the federation broker, the first directory using identification information related to the endpoint;
   accessing, by the federation broker, the second directory using the information related to the location of the endpoint.

3. The method of claim 2, wherein the identification information related to the endpoint s used as an index to the first directory, and the information related to the location of the endpoint is used as an index to the second directory.

4. The method of claim 3, wherein the first and second directories are stored on the federation broker.

5. The method of claim 4, wherein the first directory is a user directory.

6. The method of claim 5, wherein the second directory is a peer directory.

7. The method of claim 1, wherein the system comprises a federated domain, and the system is separate from the federation broker.

8. The method of claim 1, further comprising:
   returning the identified point of presence from the plurality of points of presence to a communication server.

9. The method of claim 8, wherein the communication server applies the identified point of presence to complete the requested connection to the endpoint.

10. The method of claim 8, wherein the identified point of presence comprises a port, a protocol, and an Internet Protocol address associated with the identified point of presence.

11. A communication system, comprising:
    a memory; and
    at least one processor coupled to the memory and configured to:
    receive information identifying a communication endpoint, wherein the communication endpoint is a node in an enterprise system;
    apply the information identifying the communication endpoint to obtain a location of the communication endpoint from a first directory; and
    apply the location of the communication endpoint to obtain a point of presence from a plurality of points of presence in a second directory for establishing a connection to the communication endpoint, wherein the plurality of points of presence provide entry points to the enterprise system.

12. The system of claim 11, wherein the information identifying the communication endpoint is provided to the communication system by a communication server.

13. The system of claim 12, wherein the communication server is part of a second enterprise system.

14. The system of claim 13, further comprising:
    a second communication endpoint, wherein the information identifying the communication endpoint is provided to the communication server by the second communication endpoint, and the second communication endpoint is part of the second enterprise system.

15. The system of claim 14, wherein the enterprise system and the second enterprise system are communicatively connected by an Internet Protocol network.

16. A non-transitory computer-readable device having instructions stored thereon that, when executed by at least one computing device, cause the at least one computing device to perform operations comprising:
    accessing a first directory to obtain a physical location associated with a communication endpoint in response to receiving a request for connection information related to the communication endpoint; and
    accessing a second directory to obtain a point of presence from a plurality of points of presence providing entry points to a first enterprise network, wherein the point of presence is determined to be nearest to a physical location of a first communication device.

17. The non-transitory computer-readable device of claim 16, further comprising:
    returning the point of presence to a communication server.

18. The non-transitory computer-readable device of claim 16, wherein the first directory and the second directory are stored on the non-transitory computer-readable device.

19. The non-transitory computer-readable device of claim 16, wherein the point of presence is determined to be physically closest to the physical location of the first communication device.

20. The non-transitory computer-readable device of claim 17, wherein the communication server is associated with a second enterprise network, and the request for connection information is generated by the communication server in response to a request from a second communication device associated with the second enterprise network for a connection to the communication endpoint.

* * * * *

UNITED STATES PATENT AND TRADEMARK OFFICE
CERTIFICATE OF CORRECTION

PATENT NO. : 10,277,421 B2
APPLICATION NO. : 13/285392
DATED : April 30, 2019
INVENTOR(S) : Mani et al.

Page 1 of 1

It is certified that error appears in the above-identified patent and that said Letters Patent is hereby corrected as shown below:

In the Claims

Claim 3, Column 7, Line 38, "to the endpoint s used as" should read --to the endpoint is used as--.

Signed and Sealed this
Twenty-first Day of April, 2020

Andrei Iancu
*Director of the United States Patent and Trademark Office*